United States Patent [19]
Dooley

[11] Patent Number: 5,566,815
[45] Date of Patent: Oct. 22, 1996

[54] CONVEYOR SYSTEM WITH LOAD BARS

[76] Inventor: Richard A. Dooley, 400 S. Westwood Ave., Toledo, Ohio 43609

[21] Appl. No.: 306,480

[22] Filed: Sep. 15, 1994

[51] Int. Cl.⁶ .................................................. B656 17/32
[52] U.S. Cl. ................................. 198/687.1; 198/680
[58] Field of Search ............................... 198/377, 469.4, 198/680, 687.1, 803.01

[56] References Cited

U.S. PATENT DOCUMENTS

| | | | |
|---|---|---|---|
| 3,184,042 | 5/1965 | Rutkovsky et al. | 198/465.4 |
| 4,883,165 | 11/1989 | Neiman | 198/465.4 |
| 5,000,309 | 3/1991 | Dooley | 198/680 |
| 5,143,201 | 9/1992 | Speckhart et al. | 198/465.4 |
| 5,226,525 | 7/1993 | Dooley | 198/680 |
| 5,253,742 | 10/1993 | Dooley | 198/680 |
| 5,303,815 | 4/1994 | Dooley | 198/680 |

*Primary Examiner*—Joseph E. Valenza
*Attorney, Agent, or Firm*—Allen D. Gutchess, Jr.

[57] ABSTRACT

A conveyor has an overhead rail with a generally horizontal portion and an angled portion. Rollers are rotatably supported on the rail and have supports extending therebelow and rotatably connected to the rollers. At least two elongate load bars are spaced apart from one another and located in end-to-end relationship. Loops at adjacent ends of the load bars are supported by the supports. The load bars have a plurality of angular openings spaced uniformly apart to receive hangers for carrying articles and especially panels. The hangers can be placed in any of the angular openings to accommodate panels of various widths. The angular relationship of the hangers and load bar cause the panels to turn when on the angled portion of the conveyor so that they can be placed closer together.

10 Claims, 5 Drawing Sheets

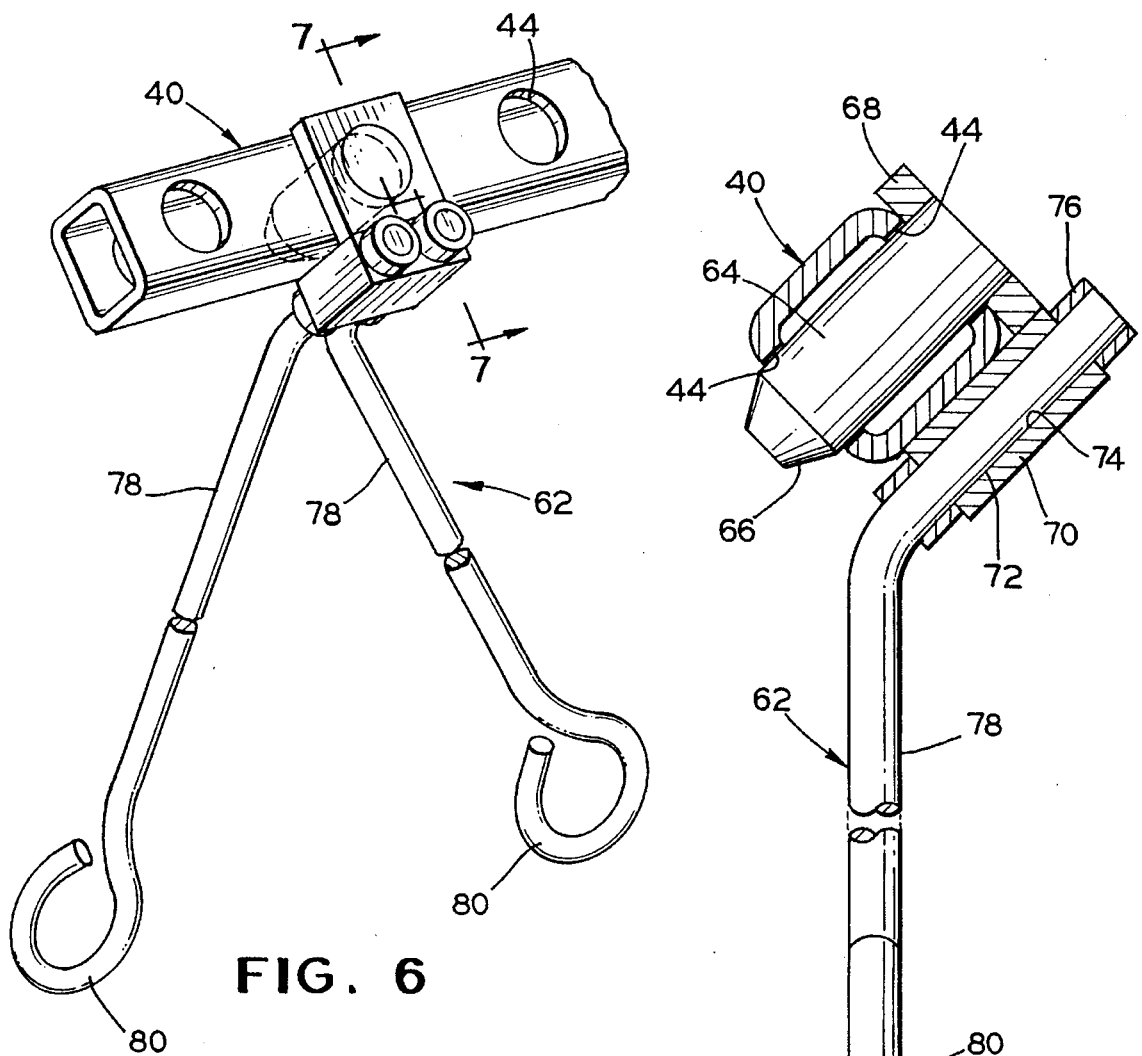
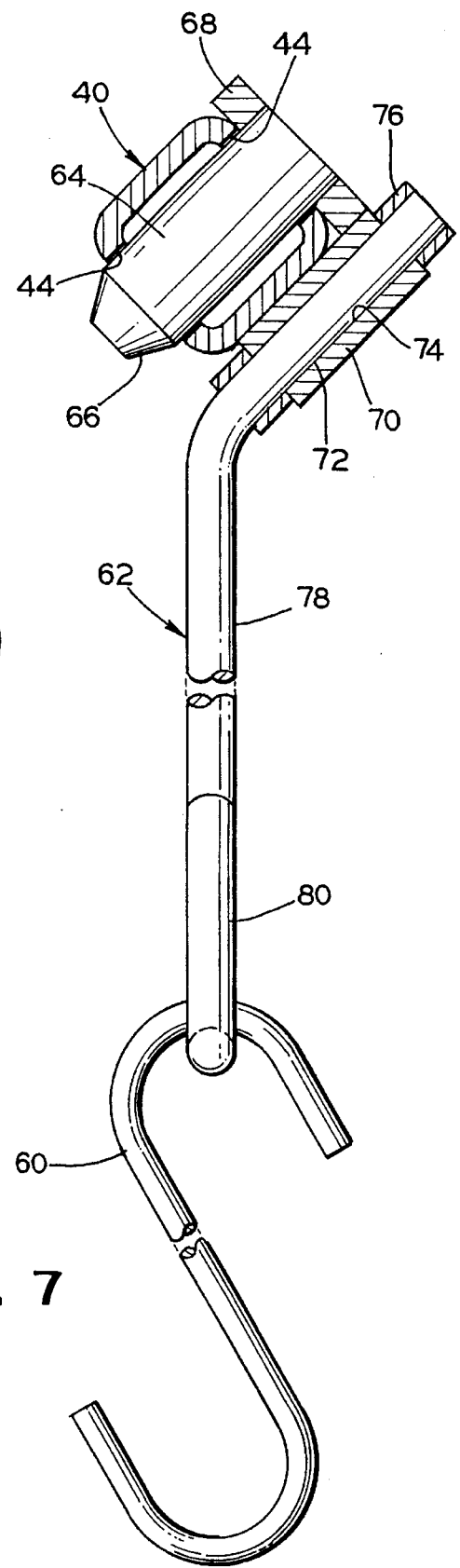
FIG. 6
FIG. 7

3,566,815

CONVEYOR SYSTEM WITH LOAD BARS

This invention relates a conveyor having rack hangers with part-carrying racks which move to predetermined transverse positions when the racks are below angled portions of the conveyor and then pivot to maintain horizontal dispositions.

The conveyor can be of the monorail type which moves racks or frames of parts or articles supported below the rail along a predetermined paths. The path typically extends through cleaning and/or painting and baking operations for the parts. Since the parts are usually cleaned or coated from both sides, the part racks must be positioned parallel to the path along which they move so that opposite surfaces of the parts can be equally treated from both sides.

The monorail conveyors typically move the parts along horizontal portions of the path as well as angular ones when the parts are moved between floors or different levels of operation. When the parts move along the angled portions of the path, the racks must not touch one another, which of necessity, requires that the racks be spaced apart a substantial distance when on horizontal portions of the predetermined path. Heretofore, to avoid contact of adjacent racks during forty-five degree ascending and descending portions of the path, for example, the racks typically were spaced apart on the horizontal portions of the path a distance equal to one and one-half times the rack width.

The unique conveyor design disclosed in my U.S. Pat. No. 5,000,309, issued Mar. 19, 1991, causes the part racks or frames to automatically rotate about upright axes between positions in which they are parallel to the predetermined path when the racks are below horizontal portions of a rail of the conveyor to positions in which they are transverse to the path when the racks are below angled, ascending or descending, portions of the conveyor rail. Consequently, the racks can be almost in contact when positioned parallel to the predetermined path and below the horizontal portion of the conveyor rail. Therefore, a substantially continuous wall of parts can be presented as they pass through cleaning, painting and baking operations, for example. The throughput capacity of an existing operation including a monorail conveyor having typically forty-five degree ascending and descending portions can be increased substantially fifty percent, maintaining the same processing cycle times and changing only the feed rates of coating materials applied to the parts. The conveyor design also enables the racks or frames to be more accurately positioned parallel to the direction of the predetermined path along which they move, which is important when precise spacing between the parts and spray gun nozzles, for example, is required for uniform coating or finishing.

A conveyor typically includes an overhead rail having at least one generally horizontal portion and one angled portion which carries the parts along ascending and descending portions of a predetermined path. The overhead rail typically has roller chains below which pivot links extend. A link was pivotally connected to the two pivot links and carried an elongate receptacle or socket having an axis lying in a plane which was perpendicular to both the conveyor rail and the path along which the articles were moved. The axis of the receptacle also was positioned to form a predetermined pivot angle relative to an intersecting horizontal line which lies in that plane when the receptacle was below a horizontal portion of the conveyor rail.

In accordance with the invention, load bars are connected by suitable linkages to the pivot links extending below the roller chains. The load bars have a plurality of angularly-disposed openings therein which are uniformly spaced apart and extend transversely to the conveyor path. The load bars are of predetermined length and connected to adjacent load bars in end-to-end relationship. The ends of the load bars are connected by common loops or members through the linkages extending below the roller chains. The load bars are spaced closely apart so that the end angular openings of each load bar are spaced equally apart from those of the next load bars. This achieves a multiplicity of angular openings with pivot angles which can extend the length of the overhead conveyor.

Hangers such as those shown in my aforementioned U.S. Pat. No. 5,000,309 can then be suitably placed in the angular openings to carry articles, and particularly panels of different widths. The hangers can be placed in any of the openings to accommodate the different widths and yet enable the panels to be closely spaced when they are being coated, etc. The hangers enable the panels to move into angular positions on angled portions of the conveyor to enable the close spacing to be obtained, as has heretofore been accomplished, as disclosed in my U.S. Pat. No. 5,000,309, as well as in my U.S. Pat. Nos. 5,226,525, issued Jul. 13, 1993; 5,253,742, issued Oct. 19, 1993; and 5,303,815, issued Apr. 19, 1994.

It is, therefore, a principal object of the invention to provide a conveyor having a plurality of load bars having openings at predetermined positions to receive hangers for carrying parts such as panels of different widths.

Another object of the invention is to provide a conveyor with load bars having uniformly spaced openings for receiving hangers in predetermined positions to move articles of different widths.

Many other objects and advantages of the invention will be apparent from the following detailed description of preferred embodiments thereof, reference being made to the accompanying drawings, in which:

FIG. 6 is a fragmentary view in perspective of a load bar with a modified hanger;

FIG. 7 is a view in section of the load bar and hanger of FIG. 6, taken along the line 7—7, with a hook added;

Figure 1:
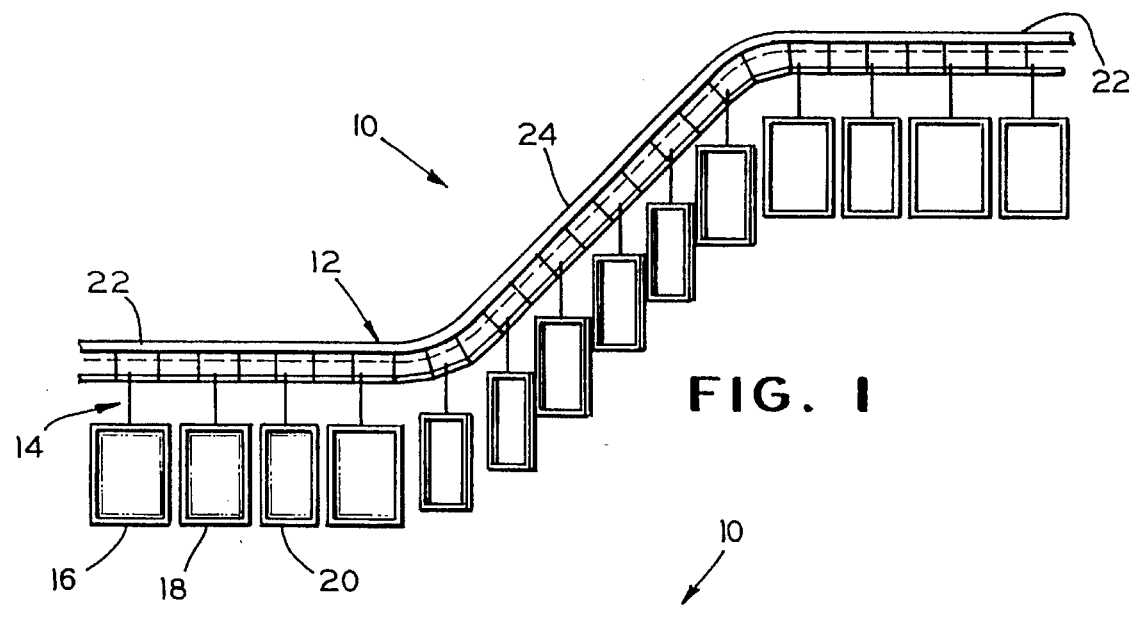
FIG. 1 is a schematic view in elevation of a conveyor in accordance with the invention.
Figure 2:
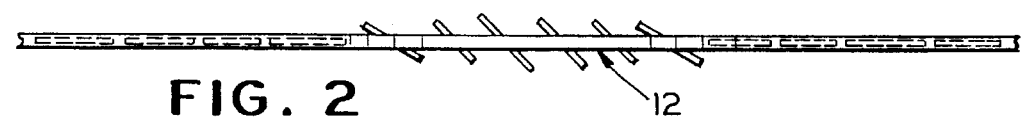
FIG. 2 is a schematic plan view in the conveyor of FIG. 1.

Referring to FIGS. 1 and 2, a conveyor embodying the invention is indicated at 10 and includes an overhead monorail 12 and support assemblies 14 for carrying articles or panels 16, 18, and 20 which are of different widths. Operations on the panels such as cleaning, coating, and baking are usually performed along horizontal portions 22 of the monorail 12 and the panels are moved between different levels or floors along angled portions 24 of the monorail 12. The panels 16–20 must be parallel and coplanar to their movement along a predetermined path as determined by the monorail 12, when they are on the horizontal portions 22 thereof. Heretofore, the panels had to to be spaced apart a sufficient distance that the edges did not contact one another when they were on the angled portion 24 of the conveyor. However, when the panels are turned transversely on the angled portion 24, they can be virtually in contact when on the horizontal portions 22. This closer spacing has a number of advantages.

Figure 3:
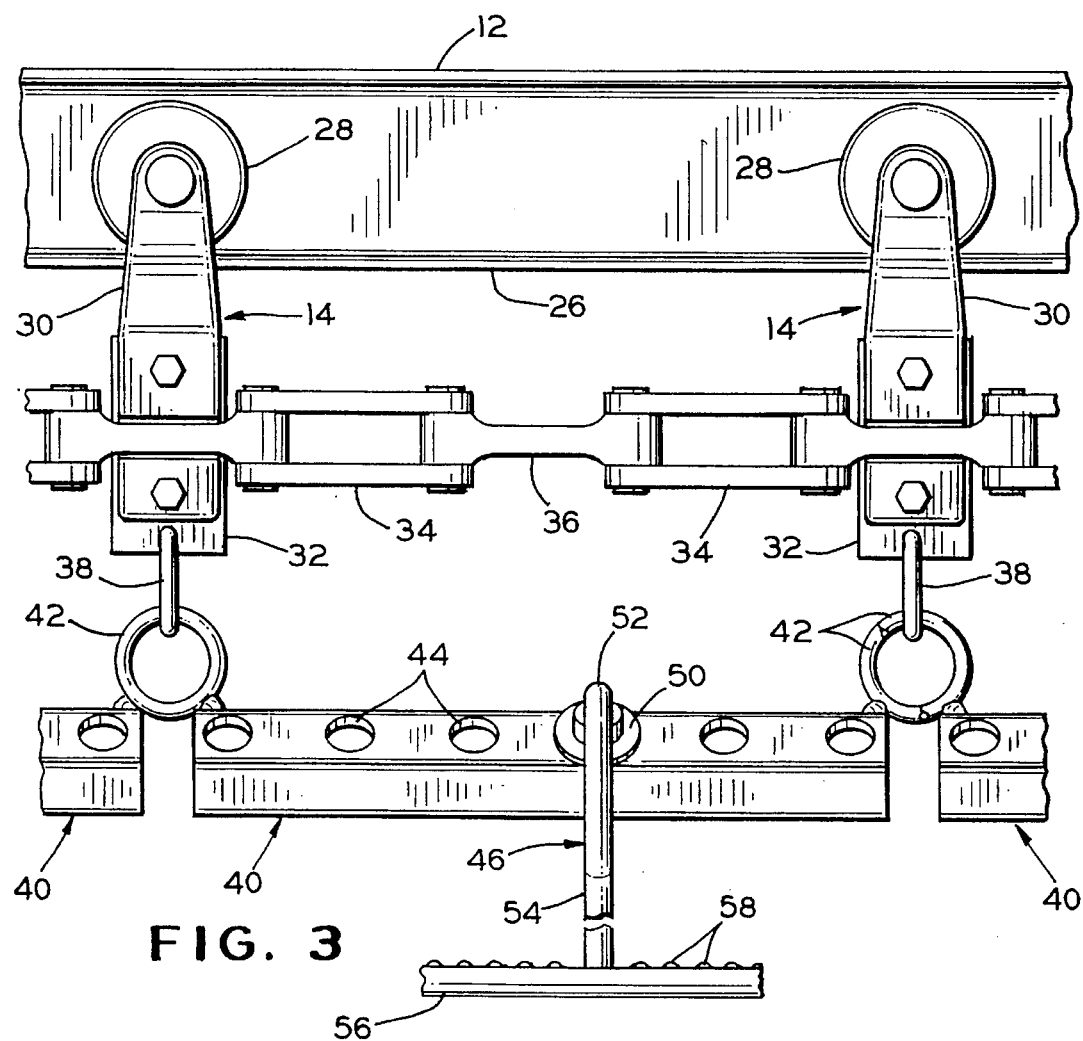
FIG. 3 is a fragmentary view in elevation including an overhead rail, rollers, a chain, and load bars embodying the invention, with a hanger connected thereto and extending therebelow.
Figure 5:
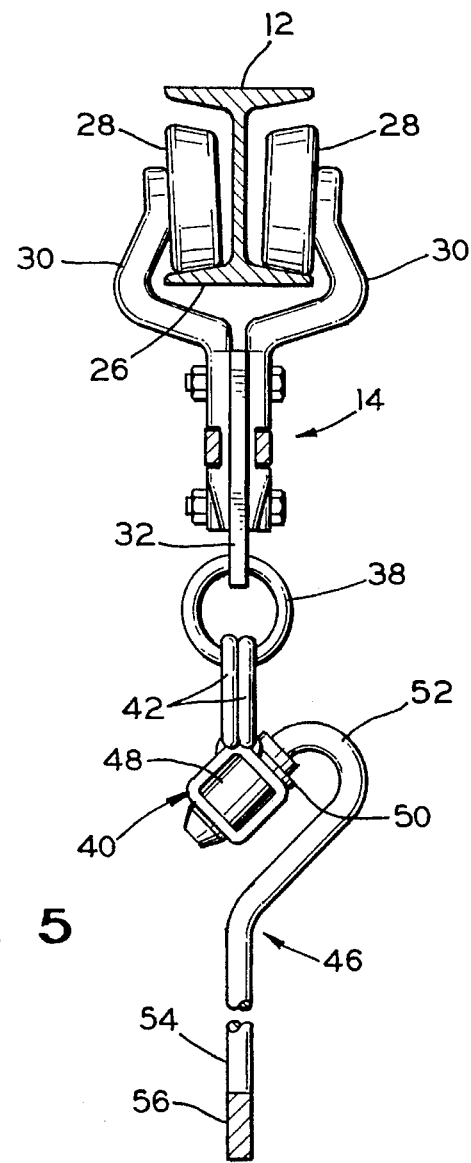
FIG. 5 is a side view in elevation of the conveyor component: shown in FIG. 3.

Referring to FIGS. 3 and 5, the overhead monorail 12 has lower flanges 26 on which are rotatably supported rollers 28. These are rotatably connected to upper ends of trolley components 30 which extend downwardly to lower tangs 32 which are suitably affixed between the components 30. The tangs are connected to move together by chain links 34 and 36 which extend the length of the conveyor in a known manner. Suitable links or loops 38 are carried by the tangs 32.

Figure 4:
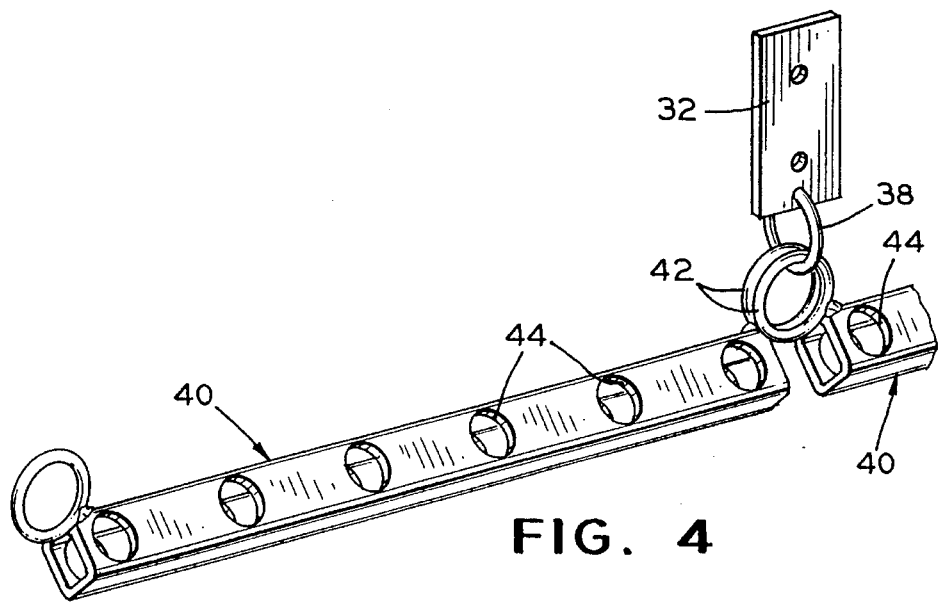
FIG. 4 is a fragmentary view in perspective of two of the load bars shown in FIG. 3.

In accordance with the invention, load bars 40 (FIGS. 3 and 4) are located below the monorail 12 in end-to-end relationship and extend the length of the conveyor 10. The load bars can be tubular, as shown, or solid, but preferably are rectangular in shape in transverse cross section. The load bars 40 have end rings 42 in overlapping relationship which are carried by the loops 38. Angled openings 44 are spaced along the load bars and have axes forming the pivot angles, typically forty-five degree angles. The openings 44 are uniformly spaced along the load bars 40 with the ends of the adjacent load bars being spaced such that the end openings 44 of these bars are also of the same uniform spacing. Typically, this spacing can be two inches, by way of example.

Hangers 46 are inserted in the openings 44, with the opening used being selected in accordance with the widths of the panels 16, 18 and 20 being transported. This enables panels of widely different widths to be carried for coating, etc. and with the panels still being closely spaced together along the horizontal portions 22 of the conveyor 10.

Referring to FIGS. 3 and 5, in this instance, the hangers 46 have angled end portions 48, which are larger in diameter, and are coaxial with the openings 44. The hangers 46 also have flanges 50 bearing on the load bar, curved portions 52, and vertical portions 54 ending in cross bars 56 having serrations or cross grooves 58 thereon. Suitable hooks such as S-hooks 60 of FIG. 7 can be carried thereon and engage the panels, either through holes in the edges of the panels or flanges extending from the edges of the panels. The hangers 46 pivot as they reach ascending and descending portions 24 of the conveyor 12, as has been described in the aforementioned patents, to place the panels at angles for clearance purposes.

A modified hanger 62 is shown in FIGS. 6 and 7. The hanger 62 has an angled end portion 64 With a tapered end 66 inserted in one of the openings 44 in the load bar 40 and is coaxial with the openings 44. The end portion 64 is affixed to a plate 68 which bears on top of the load bar and a side block 70 extending downwardly along the side of the load bar and is in contact therewith. The hanger 62 includes two upper angled portions 72 which extend through bores 74 in the block 70 and sleeves 76 above the angled portion of the block 70. The hanger also includes two downwardly-extending, straight portions 78 which terminate in loops 80 which can carry the S-hooks 60. The angled portions 72 can pivot relative to the block 70 to vary the spacing of the loops 80 to accommodate panels of various widths. The angled disposition of the hangers enables the panels to be turned transversely to the conveyor on the portions 24, as before.

Figures 8, 9:
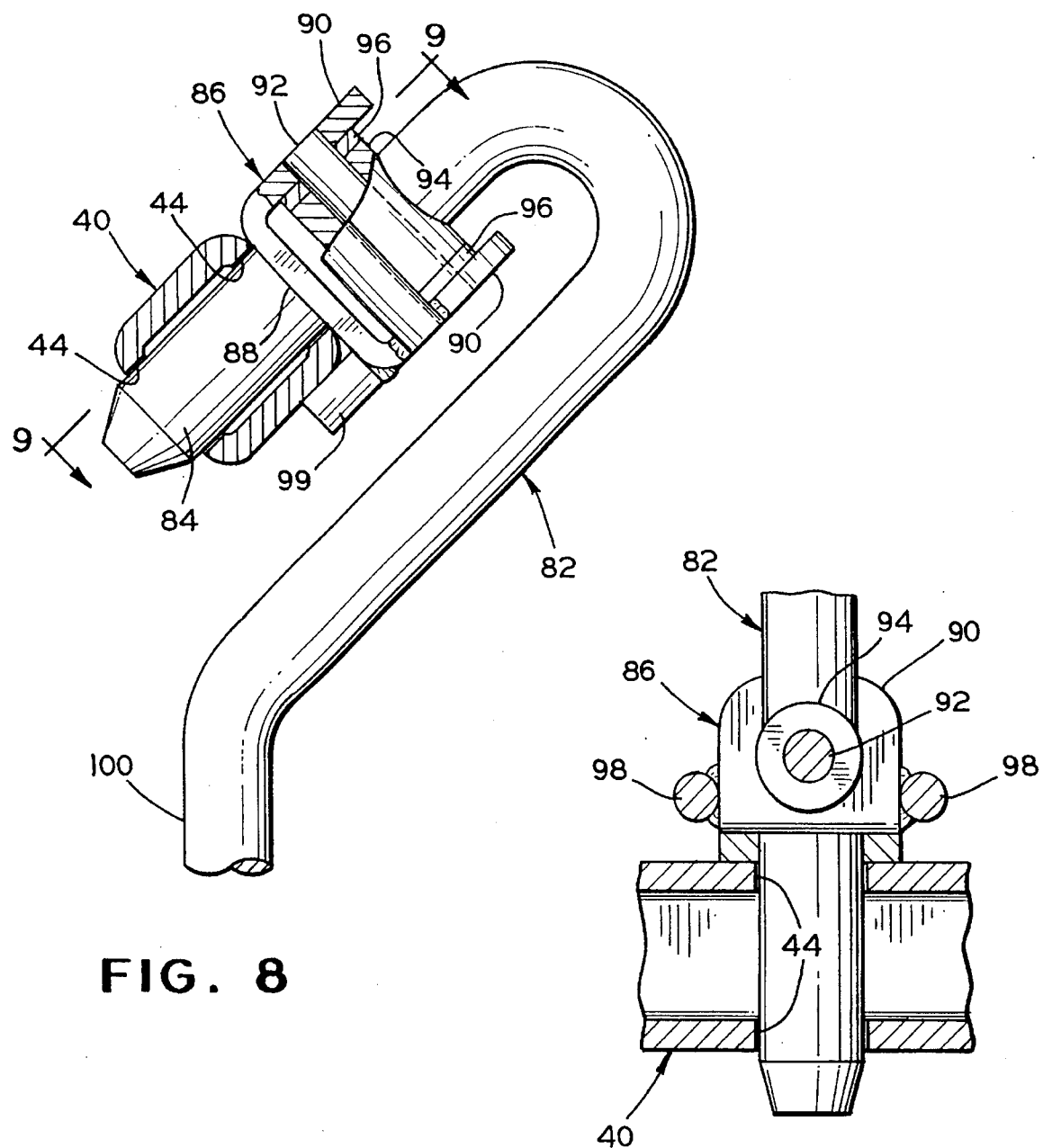
FIG. 8 is a view partly in elevation and partly in section of another modified hanger with a load bar.
FIG. 9 is a view in section taken along the line 9—9 of FIG. 8.
Figure 10:
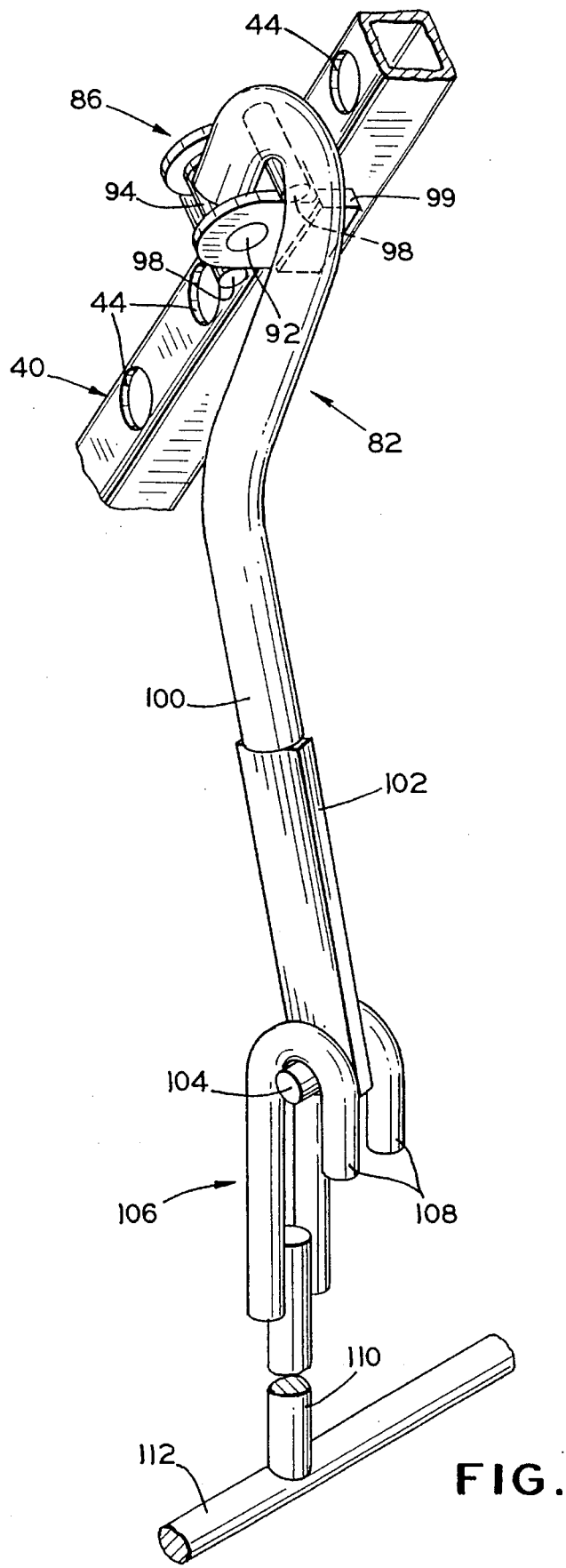
FIG. 10 is a view in perspective of the load bar and hanger of FIGS. 8 and 9 showing an upper hanger part in an extreme position and showing a lower hanger part carried at the lower end of the upper hanger part.

Referring to FIGS. 8–10, a hanger 82 functions similarly to the hangers shown in my aforementioned U.S. Pat. Nos. 5,226,525 and 5,303,815. In this regard, the hanger 82 has stops which limit the pivotal movement of the hanger on the angled portions of the conveyor and has two-part hanger portions which have a joint to enable the article being carried to remain in a vertical position when the hanger reaches the stop limits of the pivot motion.

The hanger 82 has an angled end portion 84 which is inserted in one of the openings 44 in the load bar 40, being coaxial with the openings and pivotal with respect thereto. The end portion 84 is affixed to a U-shaped bracket 86 and specifically a lower plate 88 thereof. The bracket also includes upstanding tabs 90 which hold a pin 92. The pin 92 extends through a tube 94 of the hanger on which the hanger is pivotally mounted, with washers 96 at the ends of the tube. Stop bars or rods 98 (FIGS. 9 and 10) are affixed to side edges of the bracket tabs 90 to limit the angular motion of the panels carried by the hanger, as discussed in my last two mentioned patents. A side bar 99 extends downwardly alongside the load bar 40 to keep the bracket 86 from pivoting.

To maintain the panels in a vertical disposition when the pivot movement stops, a lower vertical end portion 100 of the hanger 82 has a bar 102 carrying a pin 104. A lower hanger part 106 has hooks 108 which are received over the pin 104. The hooks are affixed to a shank 110 which terminates in a cross bar 112. This can be similar to the cross bar 56 or other suitable means can be employed to engage panels carried by these hangers. The pins 104 can be parallel to the conveyor path, as shown, or can be transverse thereto. The disposition of the pins may depend upon the maximum yaw angle of the hangers.

Various modifications of the above-described embodiments of the invention will be apparent to those skilled in the art, and it is to be understood that such modifications can be made without departing from the scope of the invention, if they are within the spirit and the tenor 6f the accompanying claims.

I claim:

1. A conveyor comprising overhead conveyor rail means having a generally horizontal portion and an angled portion, a load bar, means supporting said load bar below said conveyor rail means, said load bar having a predetermined length and a plurality of openings uniformly spaced therealong, said openings having axes forming pivot angles, and a hanger having an upper angled end inserted in one of said openings and being substantially coaxial therewith, said hanger having a block extending along a lower side of said load bar, said hanger having two upper, angled end portions pivotally received in said block, said hanger also having two lower portions extending outwardly from one another and having means for supporting a panel or the like to be carried along the conveyor.

2. A conveyor according to claim 1 wherein said load bar is of rectangular shape in transverse cross section.

3. A conveyor according to claim 1 wherein said load bar is tubular.

4. A conveyor according to claim 1 wherein a second load bar is located in end-to-end relationship with said load bar and said means for supporting said load bar also supports said second load bar.

5. A conveyor according to claim 4 wherein end openings in both of said load bars are spaced apart the same distance as the openings in said load bar.

6. A conveyor comprising overhead conveyor means having a generally horizontal portion and an angled portion, a load bar, means for supporting said load bar below said conveyor means, said load bar having a plurality of openings uniformly spaced therealong, said openings having axes forming pivot angles, and a hanger inserted in one of said openings for pivotal movement with respect to said load bar, said hanger having a block extending along a lower side of said load bar, said hanger having two upper, angled end portions pivotally received in said block, said hanger also having two lower portions extending outwardly from one another and having means for supporting a panel or the like to be carried along the conveyor.

7. A conveyor according to claim 6 wherein said load bar is of rectangular shape in transverse cross section.

8. A conveyor according to claim 6 wherein said load bar is tubular.

9. A conveyor according to claim 6 wherein a second load bar is located in end-to-end relationship with said load bar and said means for supporting said load bar also supports said second load bar.

10. A conveyor according to claim 9 wherein end openings in both of said load bars are spaced apart the same distance as the openings in said load bar.

* * * * *

UNITED STATES PATENT AND TRADEMARK OFFICE
CERTIFICATE OF CORRECTION

PATENT NO. : 5,566,815
DATED : October 22, 1996
INVENTOR(S) : Richard A. Dooley

It is certified that error appears in the above-identified patent and that said Letters Patent is hereby corrected as shown below:

Column 1, line 9, change "paths" to --path--.

Column 2, line 44, change "component:" to --components--.

Column 3, line 33, change "opening" to --openings--.

Column 3, line 53, change "With" to --with--.

Column 3, line 64, delete ".".

Column 4, line 38, change "6f" to --of--.

Signed and Sealed this

Seventh Day of January, 1997

Attest:

BRUCE LEHMAN

Attesting Officer   Commissioner of Patents and Trademarks